United States Patent
Kowles (10) Patent No.: US 10,445,235 B2
(45) Date of Patent: Oct. 15, 2019

(54) WEIGHTED DATA STRIPING

(71) Applicant: Seagate Technology LLC, Cupertino, CA (US)

(72) Inventor: Andrew Michael Kowles, Lyons, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 270 days.

(21) Appl. No.: 15/223,303

(22) Filed: Jul. 29, 2016

(65) Prior Publication Data
US 2018/0032432 A1 Feb. 1, 2018

(51) Int. Cl.
| | | |
|---|---|---|
| *G11B 5/02* | (2006.01) | |
| *G06F 12/0804* | (2016.01) | |
| *G06F 3/06* | (2006.01) | |
| *G06F 9/4401* | (2018.01) | |
| *G06F 12/1009* | (2016.01) | |

(52) U.S. Cl.
CPC .......... *G06F 12/0804* (2013.01); *G06F 3/061* (2013.01); *G06F 3/064* (2013.01); *G06F 3/0619* (2013.01); *G06F 3/0647* (2013.01); *G06F 3/0679* (2013.01); *G06F 3/0685* (2013.01); *G06F 3/0688* (2013.01); *G06F 9/442* (2013.01); *G06F 12/1009* (2013.01); *G06F 2212/608* (2013.01)

(58) Field of Classification Search
CPC .... G06F 12/0804; G06F 3/0619; G06F 9/442; G06F 12/1009
See application file for complete search history.

(56) References Cited

U.S. PATENT DOCUMENTS

| | | | |
|---|---|---|---|
| 6,272,591 B2 | 8/2001 | Grun | |
| 2004/0062516 A1* | 4/2004 | Takeda | G11B 27/036 386/278 |
| 2004/0078519 A1 | 4/2004 | Bak et al. | |
| 2010/0082636 A1* | 4/2010 | Kruus | G06F 16/13 707/747 |
| 2012/0275046 A1* | 11/2012 | Ehrlich | G06F 3/0613 360/15 |
| 2016/0371034 A1* | 12/2016 | Kang | G06F 3/0656 |
| 2017/0205863 A1* | 7/2017 | Lee | G06F 1/28 |

* cited by examiner

*Primary Examiner* — Ryan Bertram
*Assistant Examiner* — Trang K Ta
(74) *Attorney, Agent, or Firm* — Holzer Patel Drennan (57) ABSTRACT

The herein disclosed technology provides techniques for uneven striping of data objects, such as metadata, in a storage device to decrease save times for copying such objects from volatile to non-volatile memory. According to one implementation, a data object is split into multiple differently-sized data segments of variable size based on rates of data transfer to multiple disparate non-volatile receiving devices. Responsive to initiation of a power down sequence, each of the multiple data segments of the data object are simultaneously copied from volatile memory to non-volatile memory.

20 Claims, 5 Drawing Sheets

WEIGHTED DATA STRIPING

SUMMARY

In one implementation, the disclosed technology provides for a method that entails splitting a data object into multiple data segments of variable size based on rates of data transfer to multiple non-volatile receiving devices. The method further entails simultaneously exporting each of the multiple data segments of the data object from volatile memory to a different one of the multiple non-volatile receiving devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

BRIEF DESCRIPTIONS OF THE DRAWINGS

The described technology is best understood from the following Detailed Description describing various implementations read in connection with the accompanying drawings.

DETAILED DESCRIPTIONS

As the requirements for data storage, retrieval, and analysis have increased, the need for cheaper and faster data storage devices has also increased. Hard disc drives (HDDs) are widely used as data storage device computing systems. Such data storage devices include disc drives that store data on magnetic media. Solid state devices (SSDs), in contrast, use integrated circuit assemblies as nonvolatile memory to store data. SSDs offer advantages in data access speed and system performance, while HDDs offer advantages in cost. Hybrid drives, also referred to as SSHDs, combine HDD technology and NAND flash solid-state (SSD) technology to leverage advantages of cost and speed.

Some storage devices manage certain types of data in volatile memory (e.g., SRAM, DRAM) during nominal device usage. For example, frequently accessed data may be stored in a volatile memory cache to expedite certain data access requests. Likewise, mapping tables and other data objects of a device controller may also be stored and managed in volatile memory. Notably, volatile memory does not retain data when powered down. Therefore, some storage devices may be configured to transfer some types of data out of volatile memory and into non-volatile memory when executing a "power off" sequence and likewise, implement a reverse process (e.g., a transfer of data from non-volatile memory to volatile memory) when executing a "power on" sequence.

In data storage, striping is a technique that entails splitting file, objects, or other units of logically sequential data so that consecutive segments of the data are stored on different physical storage devices. Striping may be achieved, for example, by simultaneously writing parallel data streams including different segments of logically sequential data to different storage devices. By leveraging combined data rates, striping can be utilized to facilitate a reduced total time for exporting (offloading) data from volatile memory and/or quicker read times for restoring a volatile memory state from non-volatile storage media. RAID0 is the most widely used and understood striping method, which evenly divides data across 2 or more disks.

Disparate types of non-volatile storage media offer different advantages in receiving data from or transferring data to volatile memory. For instance, a data write to a magnetic disk may, in some cases, be executed more quickly than an identical data write to a flash device although the same data is readable from the flash device more quickly than from a magnetic disk. The herein disclosed storage and data management techniques seek to leverage storage characteristics of disparate storage resources and associated data rates to reduce a total write time for transferring certain data objects from volatile memory to non-volatile memory, such as during a power-down sequence of a storage device. According to one implementation, the disclosed technology provides for a weighted, uneven striping of individual data objects based on data rates of a number of receiving devices.

Figure 1:
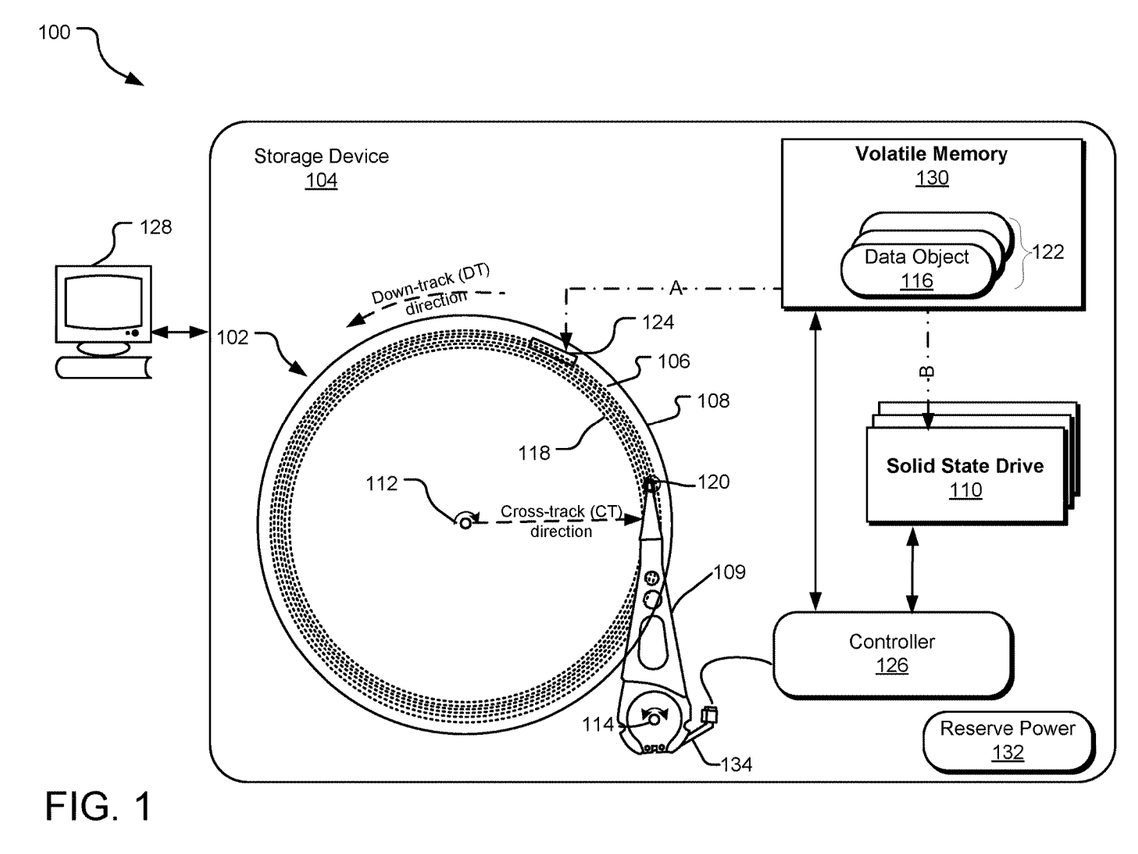
FIG. 1 illustrates an example data storage system with a storage device including a controller configured for parallel data transfers between a volatile memory and at least two different non-volatile storage media.

FIG. 1 illustrates an example data storage system 100 with a storage device 104 including a controller 126 configured for parallel data transfers between a volatile memory 130 and at least two different non-volatile storage media. As used herein, "parallel data transfers" refers to simultaneous transfers of data (e.g., reads or writes of data) along different data transmission lines. By example and without limitation, the storage device 104 is shown to be a solid state hybrid drive (SSHD) configured for parallel data transfers between the volatile memory 130 and each of a disk drive 102 and a solid state drive 110. In other implementations, the storage device 104 may take on a variety of other forms.

In some implementations, the different non-volatile storage media (e.g., the disk drive 102 and the solid state drive 110) of the storage system 100 are in a same primary enclosure that includes the volatile memory 130, as shown. In other implementations, the different non-volatile storage media are in different enclosures. For example, the storage device 104 may include an internal volatile memory and be coupled to one or more external devices that include non-volatile storage media. In some cases, parallel data transfers from the volatile memory 130 can be executed simultaneously to non-volatile storage media that are both internal, both external, or a mix of internal and external to the storage device 104.

For simplicity, the herein disclosed data striping techniques are generally described herein in relation to an example SSHD that includes at least one disk (e.g., a disk drive 102) and at least one solid state drive 110. However, it should be understood that the disclosed techniques are extendable to a variety of types of storage media in diverse system configurations.

In FIG. 1, the disk drive 102 includes a head 120 on a distal end of an actuator arm 109 positioned over a magnetic disk 108. A rotary voice coil motor that rotates about an actuator axis of rotation 114 is used to position the head 120 on a concentric data track, while a spindle motor that rotates about disk axis of rotation 112 is used to rotate the magnetic disk 108. A flex cable 134 provides the requisite electrical connection paths for the slider 120 while allowing pivotal movement of the actuator arm 109 during operation to move the head 120 between radial positions proximal to an inner diameter 118 and an outer diameter 106 of the magnetic disk 108. The disk drive 102 may include a single disk (e.g., the magnetic disk 108, as shown), or may, in other implementations, include multiple disks and heads specifically adapted to write to each disk and/or each surface of each disk.

In contrast to the disk drive 102, the solid state drive 110 does not include any moving parts. Rather, the solid state device 110 includes a memory cell array (not shown) that includes multiple analog memory cells that are each programmable to hold a continuous, analog value such as an electrical volatile or charge. The memory cell array may include memory cells of any kind (e.g., NAND, NOR) and may further include single-level cells (SLCs) or multi-level cells (MLCs). In one implementation the solid state drive 110 is an inexpensive SSD with a low data transfer rate. For example, the solid state drive 110 may be a single flash plane that receives data over an 8-bit bus (not shown). In other implementations, the solid state drive 110 is a multi-plane flash with parallel buses and/or receives data over a faster bus (e.g., 64 bits, 128 bits, etc.).

In addition to the non-volatile storage media described above (e.g., solid state drive 110 and disk drive 102) the storage device 104 further includes volatile memory 130, such as one or more DRAM, SRAM, MRAM, ferroelectric RAM, magnetic RAM, spin-torque transfer RAM, resistive RAM, etc.

When the storage device 104 is powered on, the volatile memory 130 may serve a variety of purposes, such as to store various tables, metadata, user data, cache data, etc. In FIG. 1, the volatile memory 130 stores a number of data objects 122. In one implementation, one or more of the data objects 122 are metadata objects for managing data stored in non-volatile memory locations, such as in a read cache and/or a write cache on one of the non-volatile media (e.g., the SSD 110 and/or the disk drive 102). For example, a read cache may be stored in an outer diameter region of the disk (e.g., a region 124) where a data access rate is quickest due to increased linear speed relative to the head 120. In still other implementations, a read cache is stored in the SSD 110. In either of these implementations with a read cache, the data objects 122 may include metadata objects that provide information about the structure and location of data in the read cache. For example, the data object 116 may include a table that maps extents (e.g., ranges of host logical block addresses (LBAs)) to other physical addresses of cache storage space where corresponding data is stored.

During nominal usage of the storage device 104, one or more of the data objects 122 are updated and maintained within the volatile memory 130. However, when the storage device 104 powers down, some or all of the data objects 122 may be transferred to a non-volatile memory location. In some implementations, the data objects 122 are copied to persistent storage locations during a shut-down procedure of the storage device 104, such as locations near the outer diameter region of the magnetic disk 108. In other implementations, persistent storage locations for the data objects 122 are located elsewhere on one or both non-volatile media.

In general, copying of an individual data object 116 from volatile memory 130 to non-volatile memory may be achieved more quickly if the data object 116 is segmented and saved on multiple different storage media via parallel data transfers (e.g., "striped"). For example, the data object 116 may be split into multiple portions which are simultaneous exported to the different non-volatile receiving devices, as indicated by paths 'A' and 'B' in FIG. 1. The division of the data object 116 into different segments create two or more segments of logically sequential data that can subsequently be read back to the volatile memory 130 and combined to re-create the data object 116.

In one implementation, the data object 116 is a metadata object, such as a cache metadata table. When the storage device 104 detects a power loss and/or intentionally initiates a shut-down sequence, the metadata object is divided into a first segment that is transferred to a region 124 of the magnetic disk (as indicated by a data path A) and into a second segment that is transferred to a region 116 in the solid state drive 110 (as indicated by a data path B). In implementations with more than two non-volatile storage media, the metadata object may be divided into more than two segments for parallel offload onto each of the different media.

In cases where power is unexpectedly severed, the parallel data transfers from the volatile cache (e.g., along paths A and B in FIG. 1) may be supported by a reserve power supply 132. In other (e.g., nominal) shut-down scenarios, the parallel data transfers can be supported by a primary power supply, such as a power supply to a host 128.

In various implementations, the controller 126 implements different methodologies for splitting the data object 116 into different segments for offload. In general, the controller 126 selects one or more "split points" in the data object 116 based on a theoretical data distribution that apportions data to the different non-volatile storage media. The theoretical data distribution is a distribution selected to facilitate a decrease in total offload time for the data object 116 while also facilitating division of the data object 116 in a manner that ensures data object coherency and integrity upon reconstruction of the data object 116.

In one implementation, the controller 126 selects a split point for the data object 116 based on data transfer rates of the receiving non-volatile media (e.g., the solid state drive 110 and the disk drive 102). For example, the controller 126 may compute a theoretical split point for the data object 116 that mathematically facilitates fastest total offload time for the parallel transfers of the segments of the data object 116, given the specific data transfer rates along each path (e.g., paths A and B in FIG. 1).

In some cases, the controller 126 may use additional criteria to calculate a split point of the data object 116. For example, the controller 126 may identify a practical split point based on one or more structural attributes of the data object that permit splitting in certain places more easily than others. By splitting the data object 116 into segments and offloading the different segments to different, disparate storage media in parallel data transfers, an offload time for the data object 116 can be significantly reduced as compared to an offload time for the same data object 116 along a single data channel.

In various implementations, the storage device 104 may include more than two storage media writable in parallel data transfers. For example, the storage device 104 may include any number of parallel data channels that allow for data transfers between the volatile memory 130 and non-volatile storage media. Although the non-volatile media (e.g., solid state drive 110 and disk drive 102) are, in FIG. 1, shown to be internal to the storage device 104, other implementations may include one or more of the non-volatile media external to the storage device 104. For example, the storage device 104 may be communicatively coupled to one or more external non-volatile storage resources, such as to an array including one or more hard drives assemblies, solid state drives, etc. For example, the controller 126 splits the data object 116 into segments based on data transfer rate of each of a number of receiving storage devices located internal and/or external to the storage device 104.

The controller 126 includes software and/or hardware, and may be implemented in any tangible computer-readable storage media within or communicatively coupled to the data storage device 100. As used herein, the term "tangible computer-readable storage media" includes, but is not limited to, RAM, ReRAM, MRAM, flash memory or other memory technology, and other solid state storage class memory or other optical disk storage, magnetic cassettes, magnetic tape, magnetic disk storage or other magnetic storage devices, or any other tangible medium which can be used to store the desired information and which can be accessed by a mobile device or computer. In contrast to tangible computer-readable storage media, intangible computer-readable communication signals may embody computer readable instructions, data structures, program modules or other data resident in a modulated data signal, such as a carrier wave or other signal transport mechanism.

Figure 2:
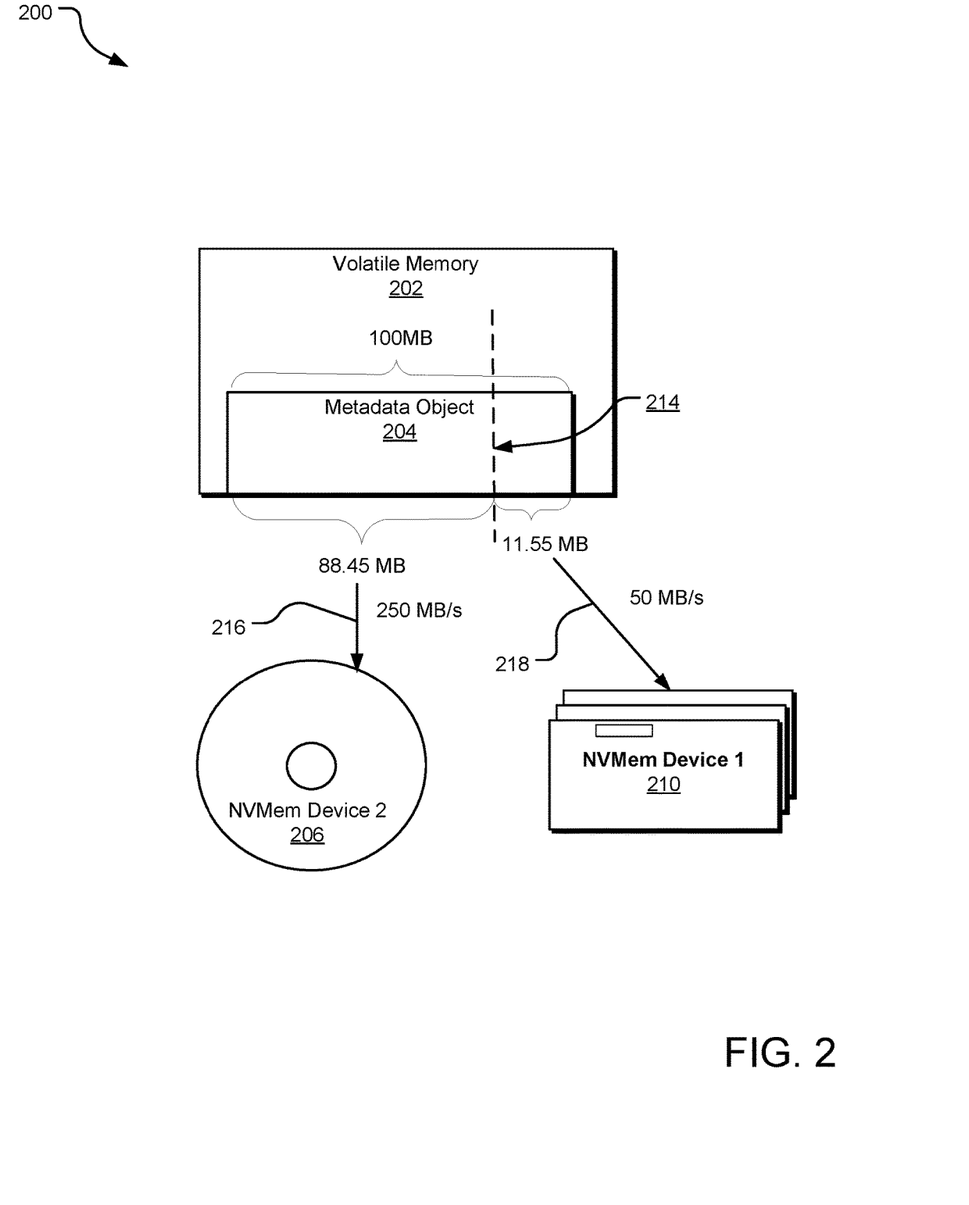
FIG. 2 illustrates another example storage system that provides for weighted striping of data objects based on data transfer rates to non-volatile storage media.

FIG. 2 illustrates another example storage system 200 that provides for weighted striping of data objects based on data transfer rates to non-volatile media. The storage system 200 includes at least a volatile memory 202 (e.g., DRAM) and two non-volatile memory devices 206 and 210. In one implementation, the volatile memory 202 and the non-volatile memory devices 206 and 210 are part of a same storage device. For example, the storage system 200 may be an SSHD including a magnetic disk and a flash device. In other implementations, the storage system 200 may include any number of disparate or identical non-volatile memory devices configured to receive data from the volatile memory 202.

During nominal use of the storage system 200, a metadata object 204 is stored and managed in the volatile memory 202. The metadata object 204 may take on a variety of forms and serve a variety of purposes. In one implementation, the metadata object 204 includes an extent table that manages a mapping of host logical block addresses (LBAs) to corresponding physical addresses of a read or write cache stored on one of the non-volatile memory devices 206 and 210. For example, the non-volatile memory device 206 may be a magnetic disk that stores a read cache in an outer diameter region. The metadata object 204 is, in this example, a cache metadata table that maps extents (ranges of host LBAs) to ranges of physical data blocks in the read cache on the magnetic disk.

Responsive to initiation or detection of a power down sequence, a device controller (not shown) initiates a data offload sequence (also referred to herein as a "striping sequence") whereby the metadata object 204 is divided into logically sequential segments that are each copied from the volatile memory 202 to one of the non-volatile memory devices 206 or 210. For example, the controller may detect a sudden loss in power, switch to a reserve power source, and initiate the data offload sequence. Alternatively, the controller may receive a nominal "shut-down" command from a host device and, responsive to receipt of the command, initiate the power down sequence.

During the data offload sequence, the controller identifies one or more theoretical "split points" in the metadata object 204 for dividing the metadata object 204 into different data segments. The number of split points identified is based on a total number of segments into which the metadata object 204 is to be divided for the offload. In some implementations, the selected number of split points is based on a number of paths available for parallel data transfers between the volatile memory 202 and the non-volatile memory devices 206 and 210. In general, the number of split points selected may equal (N−1), where N is a total number of data channels available for parallel data transfers from the volatile memory to various non-volatile storage devices.

For example, the storage device 200 has two channels 216 and 218 available for parallel data transfers of data from the volatile memory 202. A single split point is selected to generate a data segment for transmission along each of the two channels 216 and 218. In another implementation, at least one of the non-volatile memory devices 206 and 210 is a multi-plane flash configured to receive data from the volatile memory along multiple data channels simultaneously. For example, there may exist a separate data channel for writing data to each of the respective flash planes.

In one implementation, selection of the split point(s) for division of the metadata object is based on a theoretical data distribution that minimizes the total offload time for the metadata object 204. The theoretical data distribution is determined based on data transfer rates along each of the data channels 216 and 218. In the illustrated example, data can be transferred along the channel 216 at a rate of 230 MB/s and data can be transferred along the channel 218 at a rate of 50 MB per second. If the metadata object 204 were divided into two equal segments, the data transfer operation along the channel 216 may complete much more quickly than the data transfer operation along the channel 218. Thus, an optimal theoretical data distribution may unequally apportion data of the metadata object 204 to the different non-volatile memory devices 206 and 210 based on the corresponding write transfer rates.

According to one implementation, an example theoretical split point 214 is calculated by the following method. First, the non-volatile memory devices 206 and 210 are characterized in terms of performance characteristics. The total time for offloading a segment of data X to one of the non-volatile storage devices can be considered a sum of three variables: (1) busy time; (2) set-up time; and (3) active time for the offload. As used herein, "busy time" refers to, for example, time spent waiting for the non-volatile memory device to finish other currently-pending commands before beginning the offload. In one example, busy time for an HDD is about 5 milliseconds, while busy time for a NAND device is about 50 milliseconds. In contrast to "busy time," "set-up time" (also sometimes referred to as average access time) refers to time required for the non-volatile memory device to physically set itself up for a write operation. In HDD devices, this includes rotating an actuator arm and seeking a transducer head to a desired radial position. In one example implementation, set-up time for an HDD device is 17.5 milliseconds. In flash-based devices (e.g., NAND), setup time is fairly negligible (e.g., about 500 microseconds for some NAND devices). "Active time" refers to the amount of time the storage device is physically receiving and/or writing data.

Stated differently, the total time for offloading to device A (e.g., an HDD) is given by:

$$SetupTime_A + BusyTime_A + \frac{X1}{\text{Data Rate } A},$$

wherein X1 is the amount of data offloaded to device A and Data Rate A is the write data rate of device A. The total time for offloading to device B can be similarly represented using the setup time, busy time, and data rate unique to device B. In one theoretical offload scenario, the total time for offloading to device A is initially set to be equal to the time for offloading to device B. For example:

$$SetupTime_A + BusyTime_A + \frac{X1}{\text{Date Rate } A} = \quad (1)$$
$$SetupTime_B + BusyTime_B + \frac{X2}{\text{Data Rate } B}$$

where X1 and X2 represent portions of the metadata object to be offloaded to each of Devices A and B, respectively. When the size of the metadata object 204 is known, a further relation can be provided between X1 and X2:

$$X1 = ObjectSize - X2 \quad (2)$$

Thus, theoretical distribution values for X1 and X2 can be solved by substituting the right side of equation (2) for X1 in equation 1, solving for X2 in equation 1, and then using the solved value of X2 in equation (2) to solve for X1.

In one example, device A is an HDD with a write data rate of 250 MB/s (e.g., at the outer diameter of the disk) and device B is a NAND flash device with a write data rate of 50 MB/s. If the setup time and busy time values are equal to those examples provided above (17.5 and 50 milliseconds, respectively for the HDD and 500 microseconds and 5 milliseconds for NAND) and the metadata object 204 has a size of 100 MB, one can solve for values of X1 and X2 via the above methodology to arrive at 88.45 MB for X1 and 11.55 MB for X2. Stated differently, the theoretical split point 214 provides for a split of the 100 MB metadata object into segments of 88.45 MB and 11.55 MB, respectively. The 88.45 MB is offloaded to the HDD at the write rate of 250 MB/s, while the 11.55 MB is offloaded to the NAND flash device at the write rate of 50 MB/s.

The location of the theoretical split point 214 depends on the write transfer rates to the non-volatile memory devices as well as the size of the metadata object 204 for offload. In one implementation, the theoretical split point 214 is predetermined for metadata objects of one or more sizes and retrieved for use by a device controller during the data offload sequence. In another implementation, the theoretical split point 214 is dynamically calculated at the time of the data offload sequence.

In some implementations, there exist practical challenges to segmenting a data object at a calculated theoretical split point, such as the theoretical split point 214. For example, certain structural attributes of the metadata object 204 may complicate segmentation. In these cases, the device controller may utilize a variety of other criteria to determine how to split the metadata object 204 for the data offload. A few examples are discussed with respect to FIG. 3, below.

Figure 3:
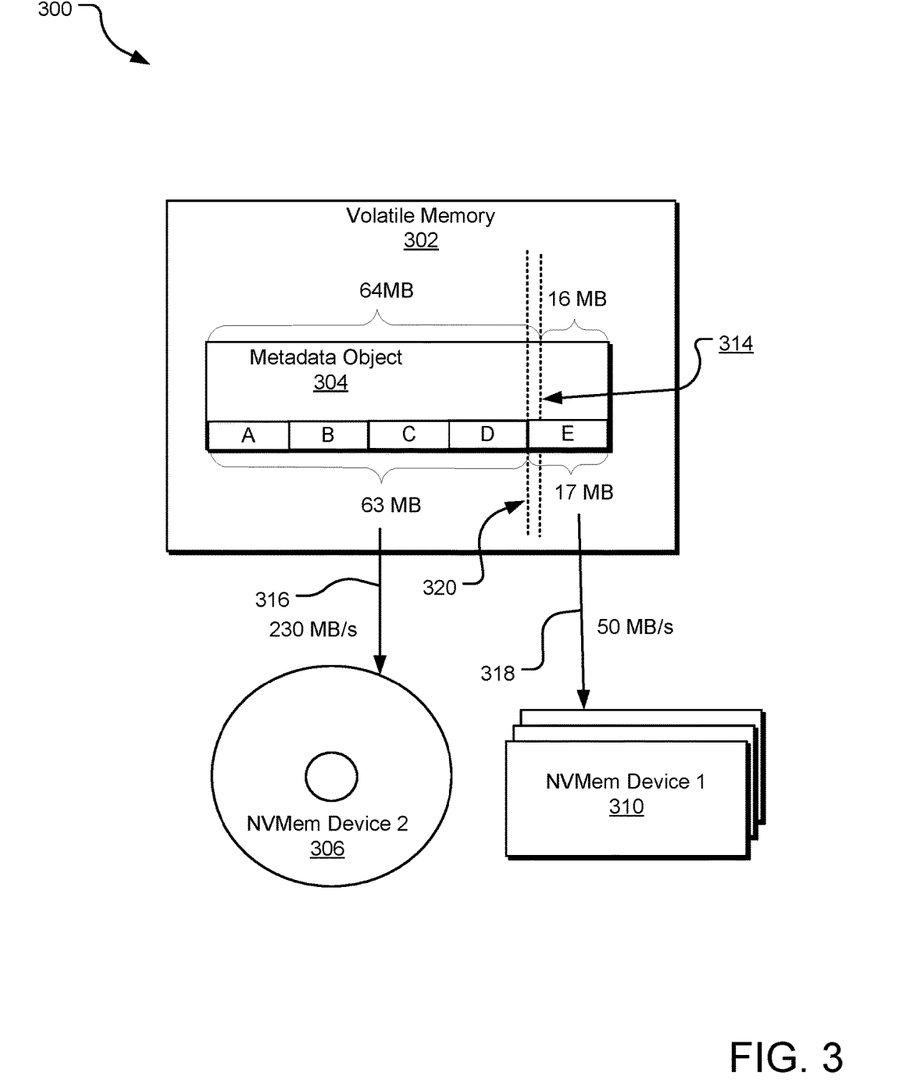
FIG. 3 illustrates still another example storage system that provides for weighted striping of data objects based on data transfer rates to non-volatile storage media.

FIG. 3 illustrates yet another example storage system 300 that provides for weighted striping of data objects based on data transfer rates between volatile and non-volatile media. The storage system 300 includes at least a volatile memory 302 (e.g., DRAM) and at least two non-volatile memory devices 306 and 310.

During nominal use of the storage system 300, a metadata object 304 is stored and managed in the volatile memory 302. The metadata object 304 may take on a variety of forms and serve a variety of purposes, including those described above with respect to the metadata object 204 of FIG. 2. Responsive to initiation or detection of a power down sequence, a device controller (not shown) initiates a data offload sequence, whereby the metadata object 304 is divided into different segments that are each copied from the volatile memory 302 to memory space on one of the non-volatile memory devices 306 and 310.

During the data offload sequence, the controller identifies one or more theoretical "split points" (e.g., a theoretical split point 314) in the metadata object 304 for dividing the metadata object 304 into logically sequential segments. In one implementation, selection of the split point(s) for division of the metadata object 304 is based on a theoretical data distribution that minimizes the total offload time for the metadata object 304, such as a distribution that accounts for the variable data transfer rates along each of parallel data channels 316 and 318 to the non-volatile memory devices 306 and 310. Calculation and identification of the theoretical split point 314 may be performed in the manner generally described above with respect to FIG. 2.

In the example of FIG. 3, the metadata object 304 has one or more structural attributes that complicate the segmenting of the metadata object 304 along the theoretical split point 314. For example, the theoretical split point 314 may fall within the middle of a host-size data block, a data sector, a code word used for encryption, a binary tree, etc. To generally illustrate this concept, the metadata object 304 of FIG. 3 is shown to include example sub-components A-E. The number, size, and purpose of the sub-components A-E may vary significantly from one implementation to another.

In one implementation, the sub-components A-E are individual sub-objects within the metadata object 304. For example, the sub-components A-E may be different tables that are included in a wrapper with a single logical clock to ensure time-consistency between each sub-object. In the same or another implementation, one or more of the sub-components A-E includes a binary tree with inter-related logical nodes. For various reasons, splitting a binary tree creates complications. For example, changes made to one corner of a binary tree can cause a ripple of change throughout the tree, the breadth of which is difficult to detect and in some cases, impossible to detect. Thus, a B+ tree or similar data structure is, ideally, intact when it is modified. Thus, it may be impractical to segment the metadata object 304 at a theoretical split point 314 if the theoretical split point 314 bifurcates a binary tree into two pieces.

In still further implementations, the sub-components A-E are host data blocks (e.g., 512 KB blocks that each correspond to a single logical block address). In another implementation, the sub-components A-E represent individual data sectors of an HDD. For practical reasons, it may be challenging to divide an individual host data block, flash page, or HDD data sector into two segments. For example, the host data block may include host data along with parity bits used to assess data reliability. Separate parity codes may, in some cases, apply to different portions (e.g., halves) of a sector. Thus, a storage device (e.g., a non-volatile memory device) may not be able to assess data reliability of a portion of a host data block without receiving the complete set of parity bits for the entire data block. Also, with some Error Correction Codes (ECC), error regeneration may not occur unless the entire data object is intact. In still another implementation, one or more of the sub-components A-E includes encryption information, such as a code word, that cannot easily be segmented without compromising the storage device's ability to perform data integrity checks on the segmented data portions stored in different physical locations.

Thus, there exist a variety of data attributes pertaining to the form, structure, and/or content of the metadata object 304 that prohibit or complicate splitting of the metadata object 304 at the theoretical split point 314. Consequently, the storage system 300 may also take into account practical or "natural" split points and proximity between practical and theoretical split points.

As generally described above, theoretical split points represent points of segmentation for fastest offload assuming the metadata object 304 can be split anywhere without execution of special processing to manage risks to coherency and integrity of data posed by the segmentation. In contrast, practical split points are conducive to segmentation due to structural attributes of the metadata object. In other words, practical split points are points where the metadata object 304 can be split without incurring overhead especially devoted to managing risks to data coherency or integrity posed by a split.

Some metadata objects can be split anywhere with equal ease. In these metadata objects, every point is a practical split point. Other metadata objects include a collection of points that are not practical split points. The storage device 300 avoids implementing splits at any location that is not a practical split point. In an implementation where the sub-components A-E represent host logical blocks, a practical split point exists at a boundary between each pair of adjacent host-size blocks. Likewise, practical split points may occur at the beginning node and end node of a binary tree, the beginning and end of a data sector, code word segment, etc.

Thus, identifying a split point may entail identifying practical split point(s) and determining whether the theoretical split point 314 corresponds to (e.g., aligns with) a practical split point. In the event that the theoretical split point 314 does not correspond to a practical split point, a practical split point 320 closest to the theoretical split point 314 is identified and used as the actual split point instead of the theoretical split point 314.

For example, rather than dividing the 80 MB of the metadata object 304 along the theoretical split point 314, forming 64 MB and 16 MB segments, the storage system 300 divides the 80 MB of the metadata object 304 along the practical split point 320, forming 63 MB and 17 MB segments. The 63 MB segment is copied to the non-volatile memory device 306 at the example rate of 230 MB/s, while the 17 MB segment is simultaneously copied to the non-volatile memory device 310 at the example rate of 50 MB/s.

In one implementation where actual split point(s) are based on logical and theoretical split points as described above, the actual split points are predetermined for a variety of metadata objects and saved in a table, such as a table within the metadata object 304. In other implementations, the storage system 300 includes logic to dynamically assess logical and/or theoretical split points to select an actual split point.

Figure 4:
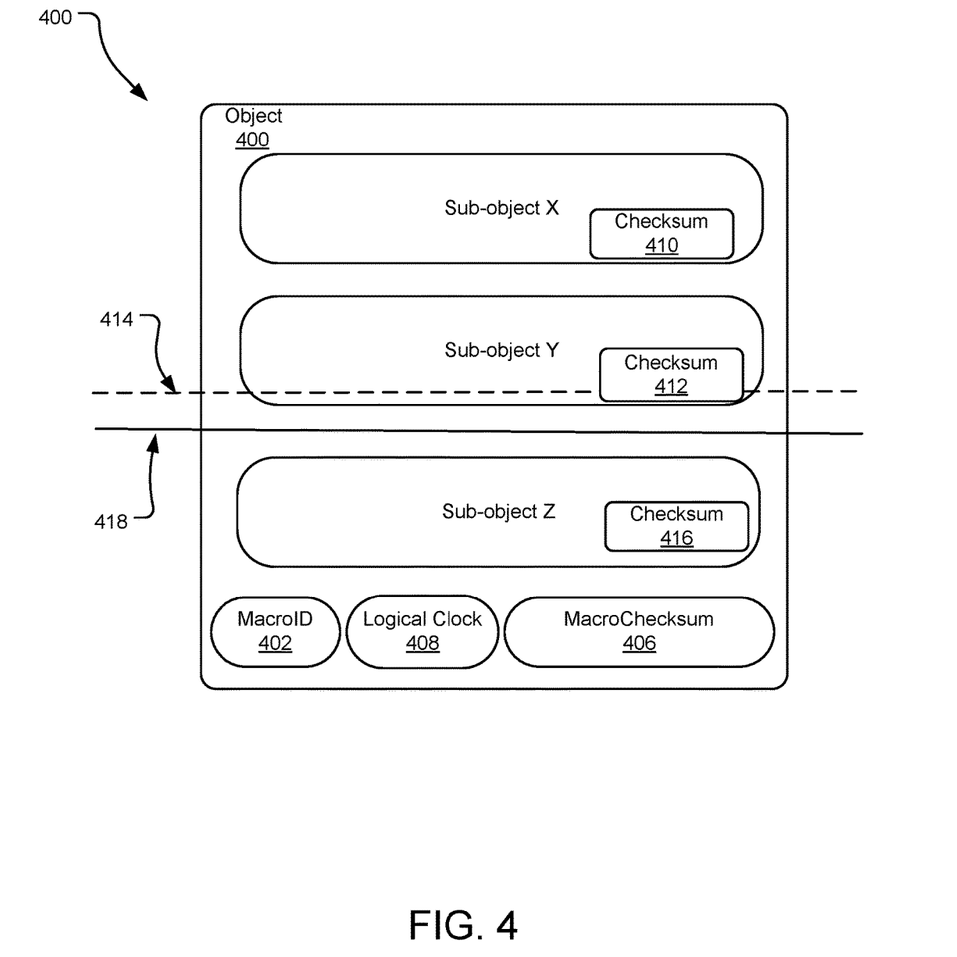
FIG. 4 illustrates an example data object that may be split and copied to non-volatile storage via weighted striping techniques.

FIG. 4 illustrates another example data object 400 that may be split and offloaded from volatile to different non-volatile media via weighted striping techniques. The data object 400 includes a number of example sub-objects X, Y, and Z, respectively.

Each of the sub-objects X, Y, and Z share a logical clock field 408. In addition, the data object 400 includes a macro ID 402 (e.g., a cryptographically secure identifier proving that the object is not random data) and a macrochecksum 406. The macrochecksum 406 provides an encoding across the entire data object 400 for the purposes of detecting a completely or incompletely restored set of smaller objects. In addition, microchecksums 410, 412, and 416 provide encoding across each individual sub-object X, Y, and Z.

During nominal use, the data object 400 is stored and managed in a volatile memory (not shown). Responsive to initiation or detection of a power down sequence, a device controller (not shown) initiates a data offload sequence, whereby the data object 400 is divided into different segments that are each copied from the volatile memory to memory space on two or more non-volatile memory devices (not shown).

During the data offload sequence, the controller identifies one or more theoretical "split points" (e.g., a theoretical split point 414) in the data object 400 for dividing the data object 400 into logically sequential segments. In one implementation, selection of the split point(s) for division of the data object 400 is based on a theoretical data distribution that minimizes the total offload time for the data object 400, such as a distribution that accounts for the variable data transfer rates along each of two or more parallel data channels to non-volatile memory devices. Calculation and identification of the theoretical split point 414 may be performed in the manner generally described above with respect to FIGS. 2 and 3.

In the example of FIG. 4, the theoretical split point 414 divides the sub-object Y into two components. This is problematic because splitting the sub-object Y may result in failure of the macrochecksum 406 and also failure of the microchecksum 412 when data is read back from the non-volatile storage devices. Recognizing this, a controller of the storage device may identify the nearest practical split 418 point (e.g., a boundary between the sub-objects Y and Z), and split the data object 400 at the practical split point 418. During the split of the data object 400, the storage device controller may generate and store a new error correction code (ECC) for each of two components on either side of the practical split point 418 such that the new ECC is stored outside of the ECCs that were applicable to the object as a whole. The logical clock 408 and macro ID 402 are stored along with the sub-object Z and are subsequently used when the object is subsequently restored from the non-volatile media.

Figure 5:
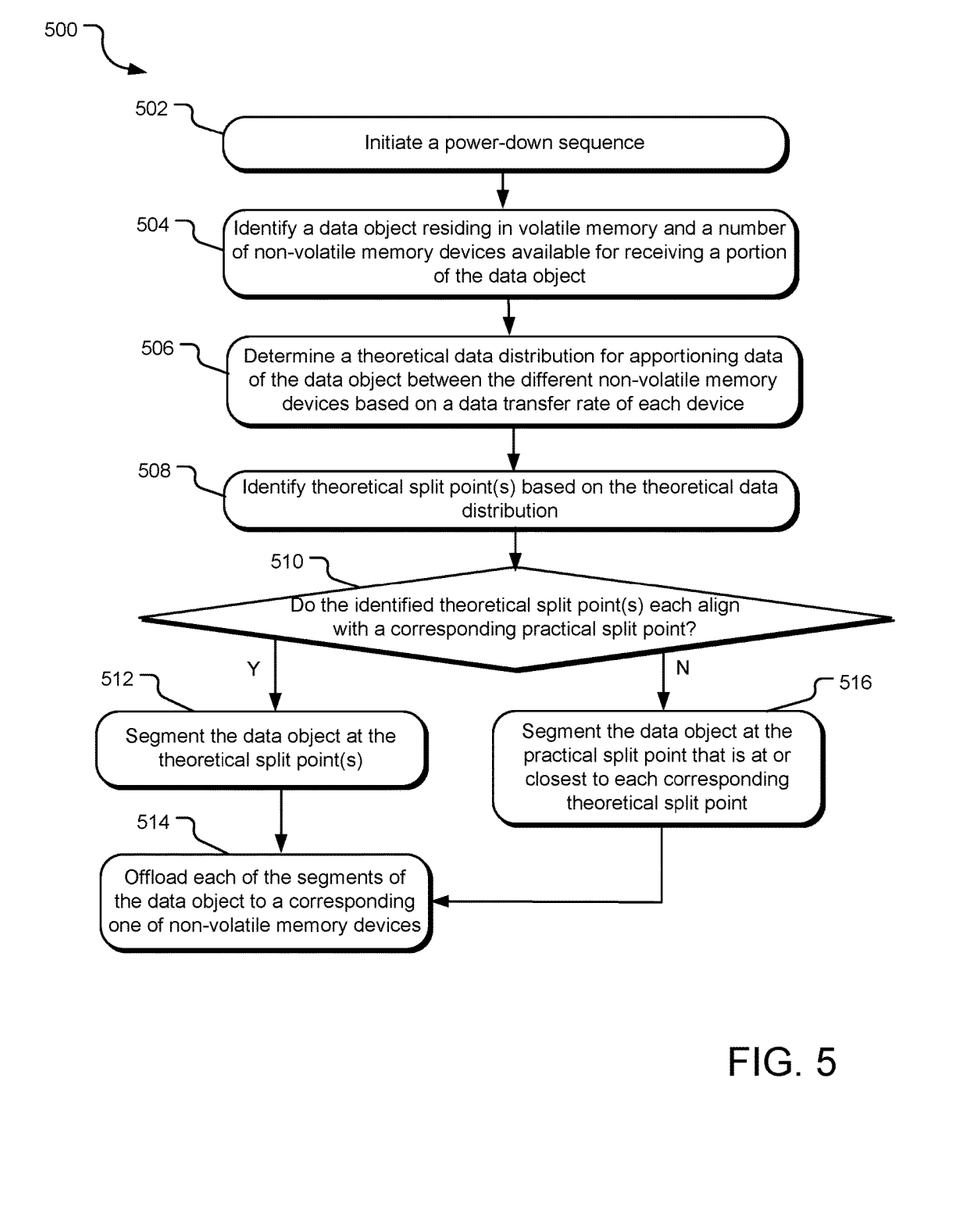
FIG. 5 illustrates example operations that provide for weighted striping of data objects based on data transfer rates to non-volatile storage media.

FIG. 5 illustrates example operations that provide for weighted striping of data objects based on data transfer rates from volatile to non-volatile storage locations. An initiation operation 502 initiates a power-down sequence for the storage device. In one implementation, the initiation operation 502 is performed in response to a sudden loss in power that causes the storage device to switch to a reserve power source. In another implementation, the initiation operation 502 is performed response to a nominal "shut-down" command from a host device.

Responsive to initiation of the power-down sequence, an identification operation 504 identifies a data object (e.g., a metadata object) residing in memory and also identifies various non-volatile memory devices (hereinafter, the "receiving devices") available for receiving a portion of the data object in a data offload. A calculation operation 506 calculates a theoretical data distribution for apportioning data of the data object among the receiving devices in parallel data transfers. In one implementation, theoretical data distribution is based on a data transfer rate of each channel to one of the receiving devices and on the total size of the data object.

An identification operation 508 identifies one or more theoretical split points for splitting the data object into logically sequential segments based on the theoretical data distribution. A determination operation 510 determines whether the identified theoretical split point(s) correspond to logical ("natural") split points of the data object or if, to the contrary, one or more of the theoretical split point(s) occur where splits are difficult to implement, such as within a binary tree, a host-size data block, etc.

If the identified theoretical split point(s) each align with a corresponding practical split point, a segmenting operation 512 segments the data object at the theoretical split point(s). If, on the other hand, one or more of the theoretical split points do not align with a corresponding practical split point, a segmenting operation 516 segments the data object based on practical split points. That is, the data object is segmented at the practical split point that is closest to each corresponding theoretical split point so as to provide a split of the data object that most closely resembles the theoretical data distribution.

In either case, an offload operation 514 offloads each of the segments of the data object to a corresponding one of the receiving devices so that a different consecutive segment of the data object is stored on each one of the receiving devices. When power is restored to the storage device, the segments may be read into the volatile memory from the non-volatile storage locations to reconstruct the data object.

The implementations described herein may be implemented as logical steps in one or more computer systems. The logical operations of the various implementations described herein are implemented (1) as a sequence of processor-implemented steps executing in one or more computer systems and (2) as interconnected machine or circuit modules within one or more computer systems. The implementation is a matter of choice, dependent on the performance requirements of the computer system. Accordingly, the logical operations making up the implementations of the implementations described herein are referred to variously as operations, steps, objects, or modules. Furthermore, it should be understood that logical operations may be performed in any order, unless explicitly claimed otherwise or a specific order is inherently necessitated by the claim language.

In the interest of clarity, not all of the routine functions of the implementations described herein are shown and described. It will be appreciated that in the development of any such actual implementation, numerous implementation-specific decisions are made in order to achieve the developer's specific goals, such as compliance with application- and business-related constraints, and that those specific goals will vary from one implementation to another and from one developer to another.

The above specification, examples, and data provide a complete description of the structure and use of example implementations. Because many alternate implementations can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
   responsive to initiation of a power down sequence for a storage device:
   identifying a plurality of practical split points in a data object based on at least one structural attribute of the data object;
   identifying a theoretical data distribution describing portions of the data object to export to each of multiple non-volatile receiving devices based on the rates of data transfer between the storage device and each one of the multiple non-volatile receiving devices, the theoretical data distribution splitting the data object at a theoretical split point;
   splitting the data object at a selected one of the practical split points to create multiple data segments, the selected practical split point being a nearest one of the practical split points to the theoretical split point; and
   simultaneously exporting each of the multiple data segments of the data object from volatile memory to a different one of the multiple non-volatile receiving devices.

2. The method of claim 1, wherein the multiple non-volatile receiving devices include at least two disparate storage resources.

3. The method of claim 1, wherein the storage device is a solid state hybrid drive and the multiple non-volatile receiving devices include at least one flash device and at least one magnetic disk.

4. The method of claim 1, wherein the at least one structural attribute of the data object is a boundary between adjacent data sectors.

5. The method of claim 1, wherein the at least one structural attribute is a binary tree and the selected one of the practical split points is an end node of a binary tree.

6. The method of claim 1, wherein different consecutive segments of the data object are stored on different devices of the multiple non-volatile receiving devices.

7. The method of claim 1, wherein the data object is a cache mapping table.

8. A storage device comprising:
   at least two disparate non-volatile storage resources configured to receive data in parallel data streams;
   a storage device controller configured to:
   initiate a power down sequence for a storage device;
   responsive to initiation of the power down sequence:
   identify a plurality of practical split points in a data object based on at least one structural attribute of the data object;
   identify a theoretical data distribution describing portions of the data object to export to each of multiple non-volatile receiving devices based on rates of data transfer between the storage device and each one of the multiple non-volatile receiving devices, the theoretical data distribution splitting the data object at a theoretical split point;
   splitting the data object at a selected one of the practical split points to create multiple data segments, the selected practical split point being a nearest one of the practical split points to the theoretical split point; and
   export each of the multiple data segments of the data object from volatile memory to a different one of the multiple disparate non-volatile storage resources.

9. The storage device of claim 8, wherein the storage device is a solid state hybrid drive and the multiple disparate non-volatile storage resources include at least one flash device and at least one magnetic disk.

10. The storage device of claim 8, wherein the data object is a cache mapping table.

11. The storage device of claim 8, wherein the at least one structural attribute of the data object is a boundary between host data blocks.

12. The storage device of claim 8, wherein the at least one structural attribute is a binary tree and the selected one of the practical split points is an end node of a binary tree.

13. One or more tangible computer-readable storage media encoding computer-executable instructions for executing on a computer system a computer process, the computer process comprising:
  responsive to initiation of a power down sequence for a storage device:
    identifying a plurality of practical split points in a data object based on at least one structural attribute of the data object;
    identifying a theoretical data distribution describing portions of the data object to export to each of the multiple non-volatile receiving devices based on rates of data transfer between the storage device and each one of the multiple non-volatile receiving devices, the theoretical data distribution splitting the data object at a theoretical split point;
    splitting the data object at a selected one of the practical split points to create multiple data segments, the selected practical split point being a nearest one of the practical split points to the theoretical split point; and
    simultaneously exporting each of the multiple data segments of the data object from volatile memory to a different one of the multiple non-volatile receiving devices.

14. The one or more tangible computer-readable storage media of claim 13, wherein the multiple non-volatile receiving devices include at least two disparate storage resources.

15. The one or more tangible computer-readable storage media of claim 13, wherein the storage device is a solid state hybrid drive and the multiple non-volatile receiving devices include at least one flash device and at least one magnetic disk.

16. The one or more tangible computer-readable storage media of claim 13, wherein simultaneously exporting each of the multiple data segments further comprises:
  exporting the largest one of the multiple data segments to a select one of the multiple non-volatile receiving devices with the highest data rate.

17. The one or more tangible computer-readable storage media of claim 13, wherein the data object is a cache mapping table.

18. The one or more tangible computer-readable storage media of claim 13, wherein the at least one structural attribute of the data object is a boundary between host data blocks.

19. The one or more tangible computer-readable storage media of claim 13, wherein the at least one structural attribute is a binary tree and the selected one of the practical split points is an end node of a binary tree.

20. The one or more tangible computer-readable storage media of claim 13, wherein different consecutive segments of the data object are stored on different devices of the multiple non-volatile receiving devices.

* * * * *